United States Patent [19]
Zee

[11] Patent Number: 5,898,580
[45] Date of Patent: Apr. 27, 1999

[54] DC/DC CONVERTER WITH A PROTECTION CIRCUIT

[75] Inventor: Kum Yoong Zee, Taman Johor Jaya, Malaysia

[73] Assignee: Thomson multimedia S.A., France

[21] Appl. No.: 08/976,571

[22] Filed: Nov. 24, 1997

[30] Foreign Application Priority Data

Dec. 2, 1996 [GB] United Kingdom .................. 9625052

[51] Int. Cl.⁶ .................................................. H02M 7/10
[52] U.S. Cl. ................... 363/50; 363/56; 363/22
[58] Field of Search ................... 363/50, 55, 56, 363/15, 22, 23, 24, 25

[56] References Cited

U.S. PATENT DOCUMENTS

| | | | |
|---|---|---|---|
| 4,293,902 | 10/1981 | White ........................................ | 363/26 |
| 4,330,816 | 5/1982 | Imazeki et al. ........................... | 363/56 |
| 4,560,851 | 12/1985 | Tsukamoto ............................ | 219/10.77 |
| 4,847,746 | 7/1989 | Rilly et al. .............................. | 363/132 |
| 5,303,137 | 4/1994 | Peterson .................................... | 363/16 |
| 5,321,596 | 6/1994 | Hurst ......................................... | 363/8 |
| 5,392,206 | 2/1995 | Peterson et al. ......................... | 363/19 |
| 5,740,021 | 4/1998 | Lecheler et al. ......................... | 363/37 |

FOREIGN PATENT DOCUMENTS 1525416  9/1978  United Kingdom .

*Primary Examiner*—Adolf Deneke Berhane
*Attorney, Agent, or Firm*—Joseph S. Tripoli; Joseph J. Laks; Marion P. Metelski

[57] ABSTRACT

The invention is about a dc/dc converter (1) fitted with switching means (11, 12) having a drive electrode (13, 14) each drive electrode (13, 14) being connected to polarization means (49,50). The switching means are to switch on and off a current coming from a direct source of current 2 and circulating in windings (17, 18, 5) of transformers (6, 7) of the converter. The improvement according to the invention comprises a protection circuit 24 connected to means (44) for detecting the value of current circulating in one of the windings (4, 5, 15, 19, 23) of the transformers. Outputs (47, 48) of circuit 24 are connected to the drive electrode (13, 14) of switching means (11, 12). Protection circuit (24) may be a bistable circuit that will lower voltage at its outputs (47, 48) in a permanent way if detected current has been to high, thus switching off in a permanent way switching means (11, 12). The switching off is made in less than a working period of the switching means (11, 12) and prevent any damage to said switching means.

14 Claims, 4 Drawing Sheets

DC/DC CONVERTER WITH A PROTECTION CIRCUIT

FIELD OF THE INVENTION

The invention pertains to the field of direct current to direct current converters (dc/dc converters).

BACKGROUND OF THE INVENTION

Known features of such a dc/dc converter 1 as shown FIG. 1 will be hereinafter described. A direct voltage source 2 supplies through connecting means 3 primary windings 4, 5 of two transformers 6, 7 respectively. In the case represented in FIG. 1, the switching means 3 are in the form of a relay 3. Relay 3 comprises a contact 8 and a control coil 9. Current in the control coil 9 is controlled by a circuit 10. The first transformer 6 is a transformer with a low reluctance which can be assimilated to a current transformer. The second transformer 7 is a voltage transformer. In the case represented in FIG. 1, the dc/dc converter is a medium power, self-oscillating, push-pull converter. The currents that can circulate in the primary winding 4 of first transformer 6 are under control of switching transistors 11, 12 whose collector-to-emitter current is dependent upon the value of polarization current of their respective bases 13 14. The polarizing current of each base 13, 14 of switching transistors 11, 12 respectively is coming from secondary windings 15 of transformer 6 and from a feed-back 52, 53 coming from a secondary winding 23 of second transformer 7. Such a dc/dc transformer works as explained below.

When the magnetic flux in a core 16 of first transformer 6 is increasing the current induced in the secondary 15 is in a first direction, and, for instance, current in the secondary is allows first switching transistor 11 to be on. A current in the primary is then flooding through a first winding 17 of primary winding 4, the collector-emitter of first transistor 11, and the primary winding of second transformer 7. When core 16 of first transformer 6 is saturated, flux in the core is no longer increasing, and consequently no more current is induced in the secondary 15 of this transformer. Transistor 11 is off, closing the circuit made by first winding 17, transistor 11 and primary 5 of second transformer 7. Magnetic field in the core 16 will then decrease, whose decreasing creates a decreasing flux in core 16 and then a current in the secondary 15 of first transformer 6. This current is in the opposite direction as the one which was previously circulating. This current will fire on transistor 12 and a current will circulate through a second winding 18 of primary winding 4. The same phenomenon as the one described above will recur at a frequency which is dependent upon the characteristics of the core 16, the windings 4 and 5 and the polarizing means 49, 50 which are connected between secondary winding 15 of first transformer 6 and bases of transistors 11, 12. Such an oscillating phenomenon needs to be initiated, this is done through a starting circuit 22.

The oscillating phenomenon that has just been described induces square waves in the primary windings 5 of the second transformer 7. This produces a square wave output across the secondary windings 19 of said second transformer 7. Those square waves are rectified through rectifiers 20, integrated, and regulated through regulating and integrating circuit 21, in order to get a desired direct voltage. Generally, in a power supply for a cathode ray tube, such as the ones in television sets or monitors, said direct voltage is fed to a full range switch mode power supply (SMPS) (not shown).

One of the most important design criteria for a power supply is reliability. That means among other features in such converters, having over current protection. This is difficult, due mainly to the fact that the input is connected to a low input voltage source; as a consequence, for medium power, the current flowing through transistors 11 or 12 may be high, for instance more than 10 amperes.

SUMMARY OF THE INVENTION.

The purpose of the invention is to provide a dc/dc converter with good over current protection, which is fast enough to prevent damages to switching transistors. It is also, in a preferred version, a dc/dc converter accepts a wide range of input voltages without having to switch any jumper or the like.

According to the invention the over current protection is obtained through a protection circuit which is coupled to the circuit formed by primary windings of first and-second transformers and which apply a polarizing state on switching transistors of the dc/dc converter. The protection circuit is itself capable of two states, a first one when the current is below a predetermined level and a second one when the current is over this same level. In the first state of polarization the dc/dc converter works as described above, in the second state the polarization of the switching transistor is such that the switching transistors are in a permanent, non-conducting state. In a preferred embodiment of the invention the protection circuit is connected to a voltage limitation circuit that automatically changes the first state of the protection circuit, and therefore the polarization state of the switching transistors 11,12, if the direct current source is of a higher voltage than the voltage corresponding to the first state of polarization of the switching transistors. This feature allows for a wide range of direct voltage sources. For instance a dc/dc converter can be connected to a battery ranging from 12 to 24 volts nominal value, which means from about 10 volts to 28 volts.

To sum up the invention is about a dc/dc converter comprises a first transformer having primary and secondary windings, a second transformer having primary and secondary windings, the primary windings of first transformer being connectable to a direct current source, switching active electronic means having a drive electrode fitted with polarization means, the switching means causing an alternating current to flow through the windings, of the transformer, dc/dc converter wherein means to detect an over current in at least one of the windings of the transformers are coupled to said winding and to a protection circuit, said circuit having a first input coupled to an output of said detecting means, a second input coupled to the direct current source, and as many outputs as drive electrodes of the switching means, said outputs being capable of two states, a first and a second, said first state being the state of said outputs when the detected current of the detection means is below a predetermined level, said second state being the state of the outputs when the current detected by the detection means has been over said predetermined level, said outputs of the protection circuit being coupled to the polarization means of the switching active electronic means, said polarization means driving the switching means in a normal working state when said outputs of said protection circuit are in the first state and driving them in a permanent off state when said outputs are in the second state.

In a preferred embodiment the invention is included in a self-oscillating push-pull, dc/dc converter fitted with:

a first transformer having at least two primary windings, a first and a second and at least one secondary winding, a second transformer having primary and secondary windings, the primary windings of second transformer having an intermediate tap, the first and second primary windings of first transformer being in series with primary windings of the second transformer and with two switching means, a first and a second, each having a drive fitted with polarization means, the first switching means being connected for switching current flowing between the first primary winding of the first transformer and the intermediate tap of the primary winding of the second transformer, the second switching means being connected for switching current flowing between the second primary winding of first transformer and the intermediate tap of the primary winding of the second transformer, the drive of each switching means receiving feedback from a secondary winding of the second transformer, the improvement comprising means to detect an over current in one of the windings of the transformers coupled to said winding and coupled to a protection circuit, said circuit having a first input coupled to an output of said detecting means, a second input coupled to the direct current source, and as many outputs as drives of the switching means, said outputs being capable of two states, a first and a second, said first state being the state of said outputs when the detected current of the detection means is below a predetermined level, said second state being the state of the outputs when the current detected by the detection means has been over said predetermined level said outputs of the protection circuit being coupled to the polarization means of the electronic switching means, said polarization means driving the switching means in a normal working state when said outputs of said protection circuit are in the first state and driving them in an off state when said outputs are in the second state.

BRIEF DESCRIPTION OF THE DRAWINGS

A detailed description of the invention will now be made in relation with the appended drawings in which.

DESCRIPTION OF A PREFERRED EMBODIMENT

Figure 1:
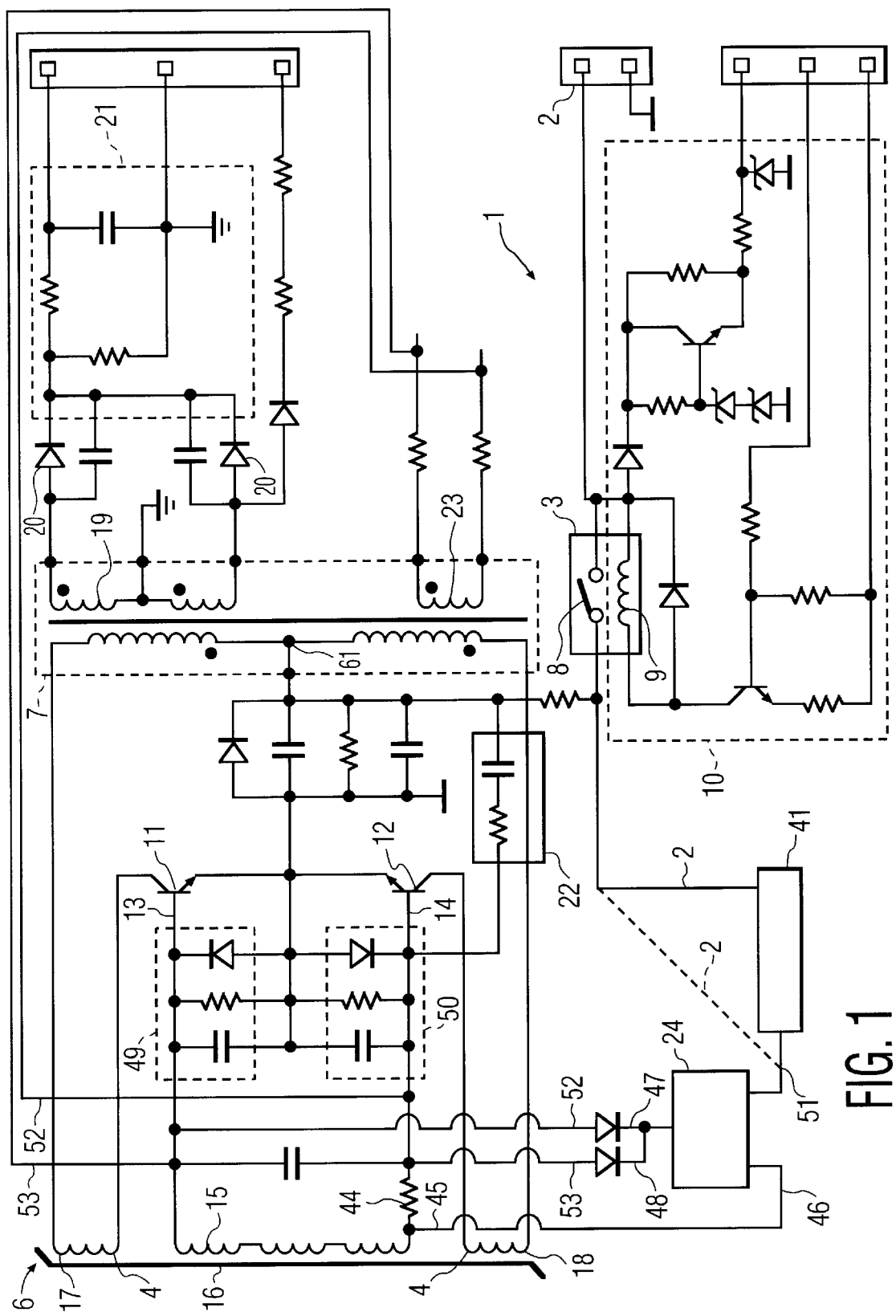
FIG. 1 is an electrical diagram of a dc/dc converter according to the invention.

In the preferred embodiment the invention is applied to a circuit as described in relation with FIG. 1. A protection circuit 24 is applied to said circuit and is represented as a function box in FIG. 1.

The circuit 24 represented in FIG. 1 has two outputs, a first one 47 and a second 48. Output 47 is to be coupled to a feedback 53, and output 48 is to be coupled to feedback 52. Circuit 24 has two inputs labeled as 46 and 51. Input 51 is coupled to voltage supply source 2; input 46 is coupled to the secondary winding 15 of current transformer 61. So, input 46 receives an image of the current circulating in the primary 4 of the current transformer 6. This image is converted in the secondary 15 of transformer 6 into a voltage through a resistor 44.

As represented in FIG. 1 the invention is for a self-oscillating, push pull, dc/dc converter fitted with:

a first transformer 6 having at least two primary windings 17, 18, a first 17 and a second 18 and at least one secondary winding 15;

a second transformer 7 having primary 5 and secondary 19, 23 windings, one 5 of the primary windings of second transformer having an intermediate tap 61;

the first 17 and second 18 primary windings of first transformer 6 being in series with primary windings 5 of the second transformer 7 and with two electronic switching means 11, 12, a first 11 and a second 12, each having a drive 13, 14 fitted with polarization means 49, 50 the first switching means 11 being connected to switch current flowing between the first primary winding 17 of the first transformer 6 and the intermediate tap 61 of the primary winding 5 of the second transformer 7, the second switching means 12 being connected to switch current flowing between the second primary winding 18 of first transformer 6 and the intermediate tap 61 of the primary winding 5 of the second transformer 7 the drive 13, 14 of each switching mean 11, 12 receiving feedback 52, 53 from a secondary winding 23 of the second transformer 7, the improvement comprising a resistor 44 to detect an over current in one of the windings 15 of the transformers 6, coupled to said winding 15, and coupled to a protection circuit 24, said circuit 24 having a first input 46 coupled to an output 45 of said detecting means 44, a second input 51 coupled to the direct current source 2, and as many outputs 47, 48 as drives 13, 14 of the switching means 11, 12, said outputs 47, 48 being capable of two states, a first and a second, said first state being the state of said outputs 47, 48 when the detected current of the detection means 44 is below a predetermined level, said second state being the state of the outputs 47, 48 when the current detected by the detection means 44 has been over said predetermined level, said outputs 47, 48 of the protection circuit 24 being coupled to the polarization means 49, 50 of the electronic switching active electron-ie means 11, 12, said polarization means 49, 50 driving the switching means 11, 12 in a normal working state when said outputs 47, 48 of said protection circuit 24 are in the first state and driving them in an off state when said outputs are in the second state.

Figure 2:
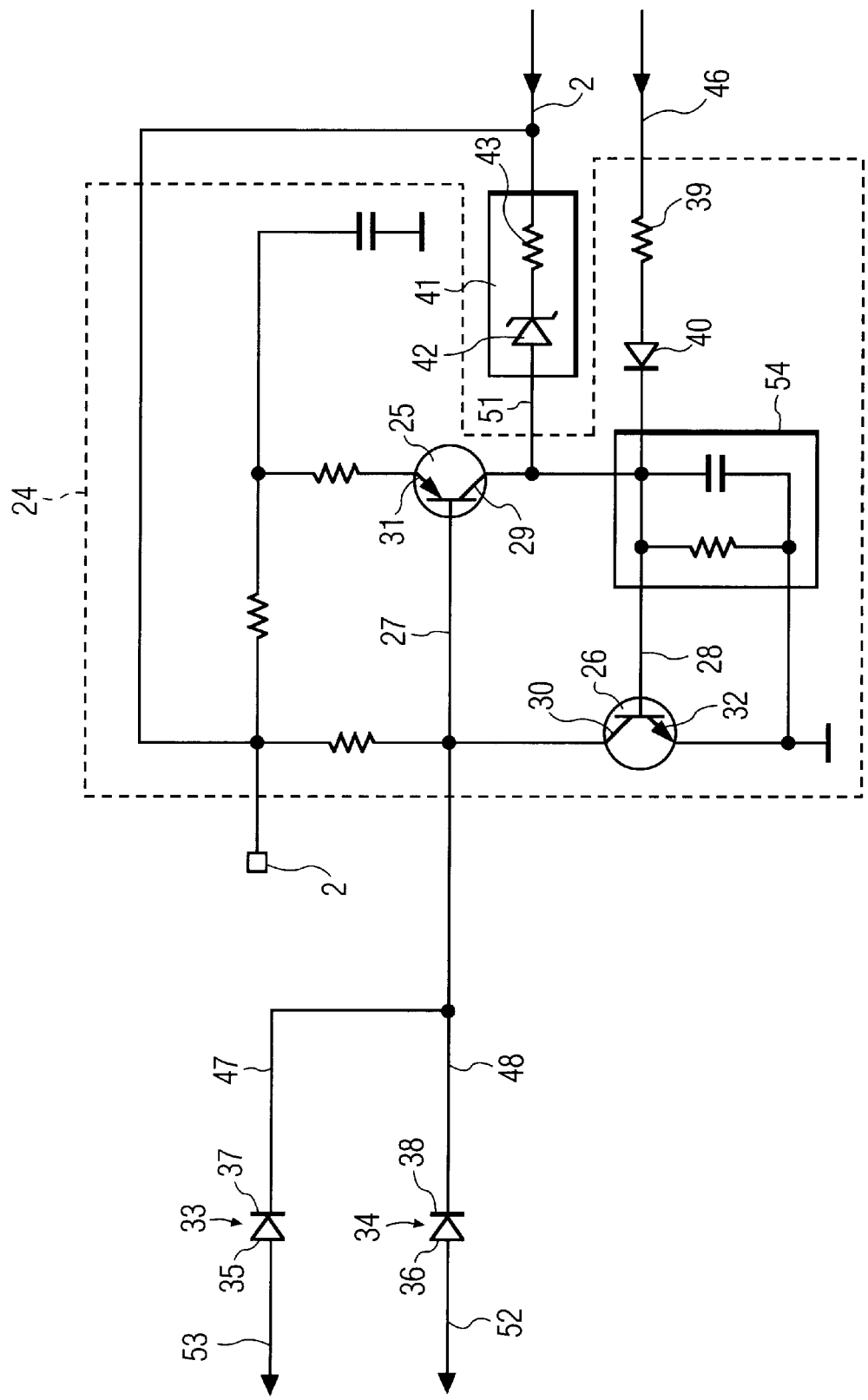
FIG. 2 is an electrical diagram of a preferred embodiment of a circuit to be implemented in a dc/dc converter according to the invention.

An example of protection circuit 24 is represented on FIG. 2. This protection circuit acts as a silicon controlled rectifier (SCR). This circuit is equivalent to a two-stage multivibrator, or a Schmitt trigger, or a flip-flop circuit. The example of such a circuit as represented FIG. 2 will now be described. Protection circuit 24 comprises mainly two transistors, a first 25 and a second 26, each with a base 27, 28, respectively, a collector 29, 30, respectively, and an emitter 31, 32, respectively. Each transistor has also polarizing means represented but not labeled. Circuit 24 has two outputs 47, 48; that is, one for each polarizing mean 49, 50. In the preferred embodiment the outputs 47, 48 are connected to diodes 33, 34, each having an anode 35, 36 and a cathode 37, 38. The base 28 of second transistor 26 is connected to input 46 through a resistor 39 and a diode 40. Collector 30 of transistor 26 is connected to the base 27 of transistor 25 and to the outputs 47, 48 of protection circuit 24. As already stated above, in the preferred embodiment each output 47, 48 is connected respectively to cathodes 37, 38 of diodes 33, 34. Circuit 24, whose outputs 47, 48 are connected to diodes 33, 34, works as follows.

If an over current is present, a higher voltage obtained through resistor 44 is applied at input 46 to base 28 of transistor 26., and this transistor is fired on, so that a current is flooding from its collector to its emitter. That means that the voltage at the bases of switching transistors 11, 12 is lowered so that the switching transistors are off. The drop of voltage at the collector of transistor 26 is also a drop of voltage at the base of transistor 25 so that transistor 25 is fired on; a current is flooding from the collector to the emitter of this transistor. That means that the base 28 of transistor 26 will be maintained with a polarizing current even if the over current coming through input 46 stops. In such a way the new state of polarization is maintained. This is a way to create a protection to switching transistors 11, 12 when the incoming over current at input 46 is a pulsed current that would induce permanent transients that would damage switching transistors 11, 12. The threshold level to fire on transistor 26 is determined by the value of resistor 39. The accepted duration of the over current is determined by the time constant of an RC circuit 54 comprising a resistor and a capacitor connected at the base 28 of transistor 26 and at the cathode of diode 40. This duration is decreasing when over current is increasing. Also, in the case represented in FIG. 2, the voltage at the cathodes 37, 38 of diodes 33,34 being low any voltage applied to secondary winding 23 of transformer 7 will no longer be fed back to the base of switching transistors 11, 12 but will be dropped through diodes 33,34. Thus diodes 33,34 act as clamping means that prevent feedback voltage from being dropped down as long as outputs 47, 48 of protection circuit 24 are in the first state, and that drop down any feedback to polarization means 49, 50 when outputs 47, 48 are in the second state.

In the preferred embodiment of the invention, second input 51 of circuit 24 is connected to direct current source 2 through a circuit 41 whose purpose is to change polarizing value of switching transistors 11, 12 in an automatic way when the voltage value of the incoming voltage source 2 is increased. This change of polarizing value is to optimize base drive of switching transistors.

Circuit 41 is made of a zener diode 42 and of a resistor 43 connected in series between direct source 2 and input 51, itself connected to collector 29 of transistor 25. If the voltage is increased up to a value sufficiently high to fire on zener diode 42, a voltage is applied to collector 29 of transistor 25, and this voltage is such that transistors 25 and 26 are partially conducting. The voltage at outputs 47, 48 of circuit 24 is lowered so that the voltage at bases of switching transistors 11,12 is lowered and collector emitter current is reduced.

Figure 3:
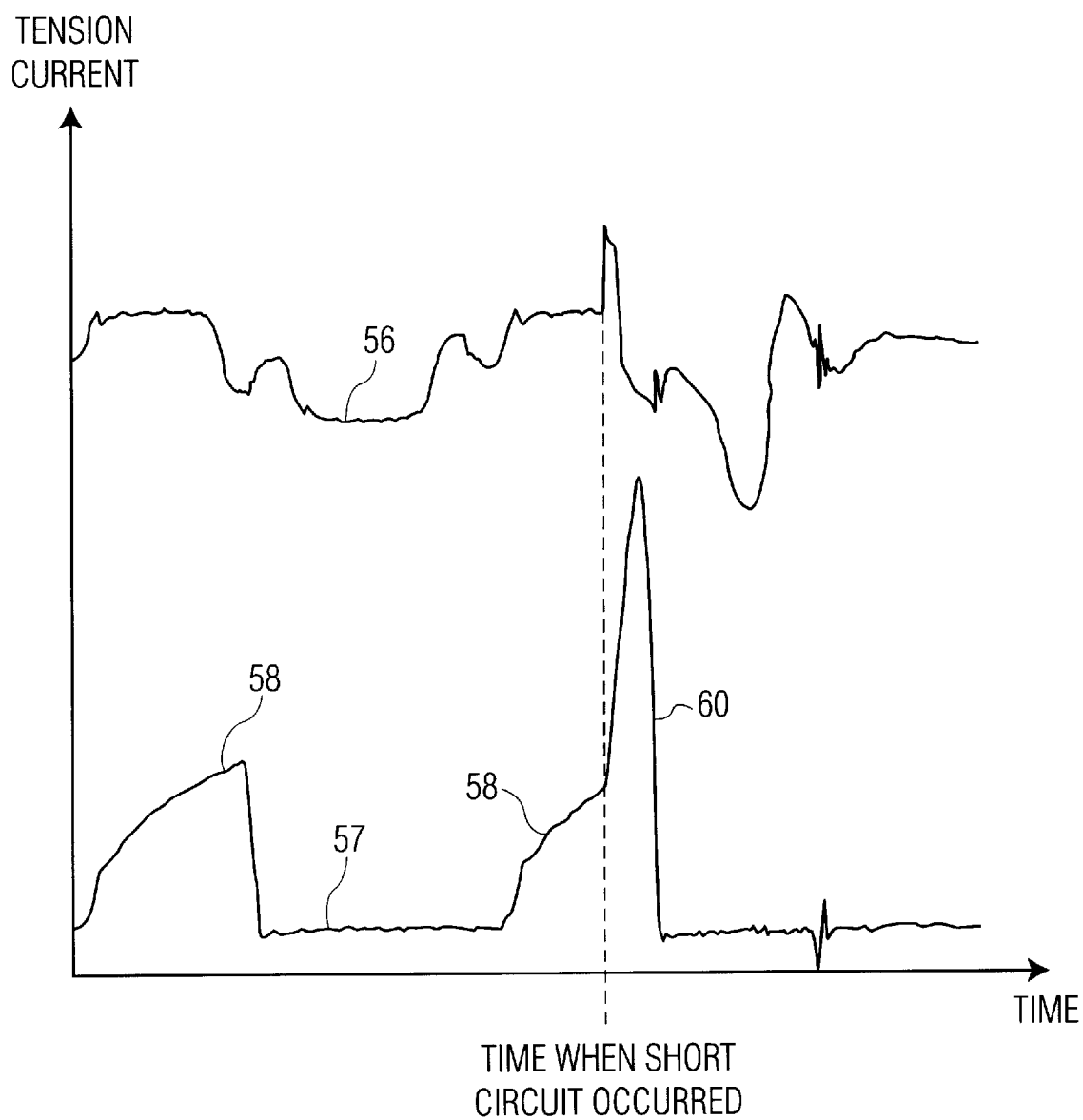
FIG. 3 illustrates results that are obtained in a dc/dc converter fitted with a protection circuit according to the invention.

The result which is achieved for over current protection is illustrated FIG. 3. This figure represents two curves. The abscissa axis represents the time. The first curve 56 represent the voltage level at input 46. A peak of voltage is marked by a vertical dashed line. This dashed line marks the point when an over current has just been detected. The second curve 57 represents the collector to emitter current of switching transistor 11. This current is normally made of pulses such as the one represented in 58. When the over current happened a second pulse 58 had begun. The short circuit is marked by a peak 60. It can be seen that, due to the action of protection circuit 24 the current comes back to 0 in a time which is shorter than half the period of the switching transistor 11.

Figure 4A:
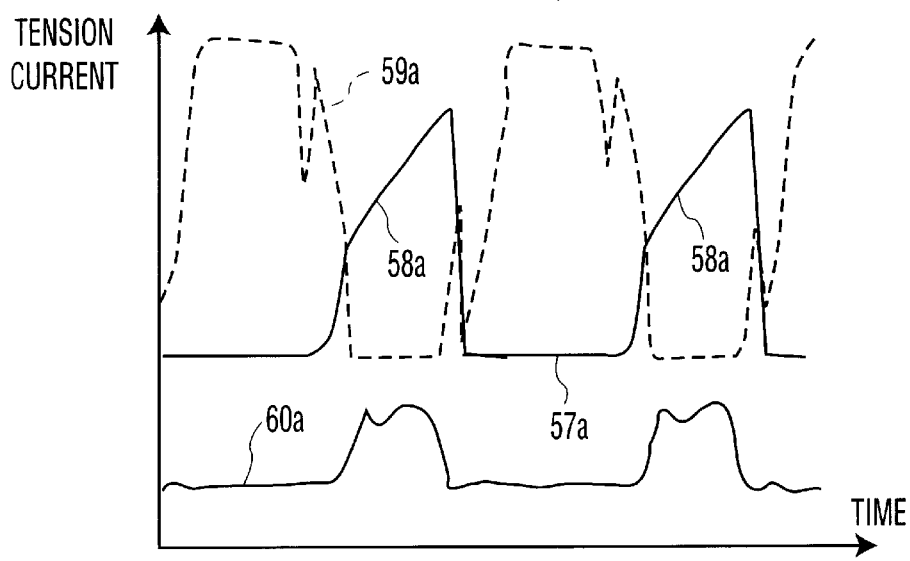
FIGS. 4a, b&c represents curves to illustrate improvements achieved in the range of dc input voltages connectable to a preferred embodiment of a dc/dc converter according to the invention.
Figure 4B:
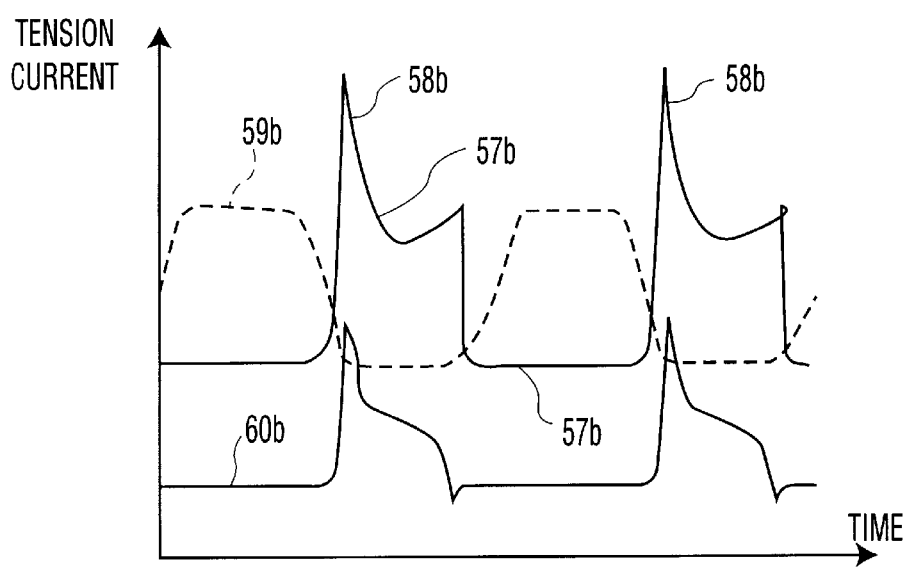
Figure 4C:
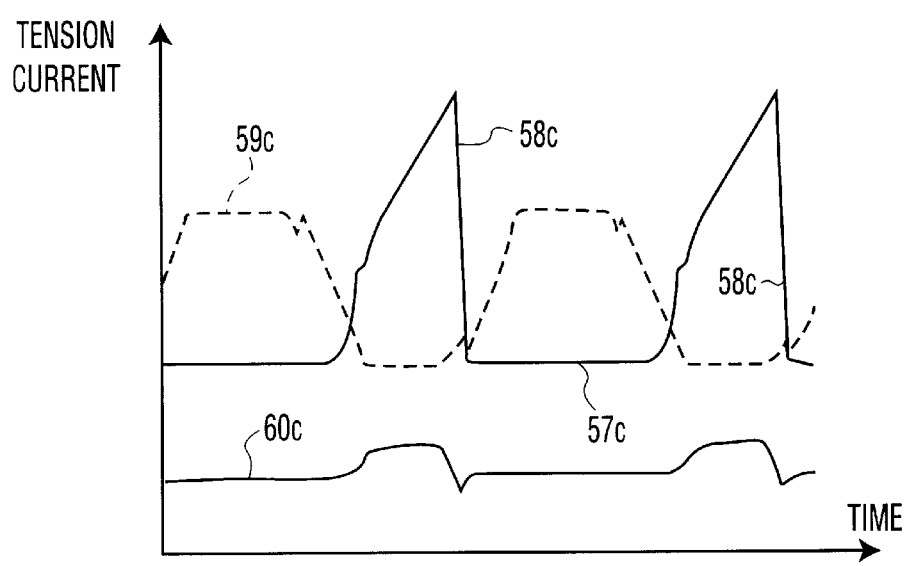

The result achieved by the optimum base drive circuit 41 is illustrated in FIGS. 4a, 4b, and 4c. Each of these three figures represents three curves, which are:

the variations in time of collector to emitter current of one of the switching transistors, (curves 57a, 57b, and 57c, respectively;

the variations of voltages at the collector of the same switching transistor (curves 59a, 59b, 59c, respectively; and the variations of the current base to emitter at the same switching transistor (curves 60a, 60b, and 60c, respectively.

The curves of FIG. 4a are for a source 2 of 12 volts, for which the circuit is best adapted. The curves of FIG. 4b are for a source 2 of 24 volts without the circuit 41 of FIG. 2. FIG. 4c is for the same source of 24 volts, but with the optimum base drive circuit 41. It can be seen that peaks of current which are present on curves 57b and 60b are not present on curves 57c and 60c. That means that heat dissipation in switching transistors 11, 12 is brought back to an acceptable level due to the action of circuit 41.

I claim:

1. Dc/dc converter comprising: a first transformer having primary and secondary windings; a second transformer having primary and secondary windings; the primary windings of the first transformer being connectable to a direct current source; electronic switching means having a drive electrode fitted with polarization means, the switching means causing an alternating current to flow through the windings of the transformer; means coupled to the secondary winding of the first transformer to detect an over current in at least one of the switching transistors; and a protection circuit coupled to said detecting means, said protection circuit having a first input coupled to an output of said detecting means, a second input coupled to the direct current source through an optimum drive circuit, and as many outputs as drive electrodes of the switching means; said outputs of said protection circuit being capable of first and second states, said first state being the state of said outputs when the detected current of the detection means is below a predetermined level, said second state being the state of the outputs when the current detected by the detection means has been over said predetermined levels; said outputs of the protection circuit being coupled to the polarization means of the electronic switching means; said polarization means driving the switching means in a normal working state when said outputs of said protection circuit are in the first state and driving them in a permanent off state when said outputs are in the second state; and said optimum drive circuit changing the first state of the outputs of said protection circuit, said first state being settled to a first level when the direct current source provides a first range of voltages and to a second level which is lower than the first level when the direct current source provides a second range of voltages which are higher than the voltages of the first range.

2. Dc/dc converter according to claim 1, wherein the polarizing means of the switching means are in a circuit comprising in series primary windings of the first and second transformers, and wherein said polarizing means are coupled to feedback coming from one of the secondary windings of the second transformer.

3. Dc/dc converter according to claim 2, wherein said feedback coming from one of the secondary windings of the second transformer is connected in parallel to diodes which are in a conductive state when the outputs of the protection circuit are in said second state.

4. Dc/dc converter according to claim 3, wherein said diodes are also connected to the outputs of said protection circuit.

5. Dc/dc converter according to claim 1, wherein said switching means are transistors.

6. Dc/dc converter according to claim 1, wherein the optimum drive circuit comprises a zener diode in series with a resistor.

7. Dc/dc converter according to claim 1, wherein said protection circuit is a bistable circuit.

8. Self-oscillating push-pull dc/dc converter comprising:

a first transformer having first and second primary windings and a secondary winding;

a second transformer having primary and secondary windings, the primary windings of the second transformer having an intermediate tap;

the first and second primary windings of the first transformer being in series with the primary windings of the second transformer and with first and second electronic switching means, each switching means having a drive fitted with polarization means, the first switching means being connected for switching current flowing between the first primary winding of the first transformer and the intermediate tap of the primary winding of the second transformer, and the second switching means being connected for switching current flowing between the second primary winding of the first transformer and the intermediate tap of the primary winding of the second transformer, the drive of each switching means receiving a feedback from a secondary winding of the second transformers; means coupled to the secondary winding of the first transformer to detect an over current in one of the switching transistors windings of the transformers coupled to said winding; and a protection circuit coupled to said detecting means, said protection circuit having a first input coupled to an output of said detecting means, and a second input coupled through an optimum drive circuit to the direct current source, and as many outputs as drives of the switching means; said outputs of said protection circuit being capable of first and second states, said first state being the state of said outputs when the detected current of the detection means is below a predetermined level, and said second state being the state of the outputs when the current detected by the detection means has been over said predetermined level; said outputs of the protection circuit being coupled to the polarization means of the electronic switching means, said polarization means driving the switching means in a normal working state when said outputs of said protection circuit are in the first state and driving them in an off state when said outputs are in the second state; and said optimum drive circuit changing the first state of the outputs of said protection circuit, said first state being settled to a first level when the direct current source provides a first range of voltages and to a second level which is lower than the first level when the direct current source provides a second range of voltages which are higher than the voltages of the first range.

9. Dc/dc converter according to claim 8, wherein the polarizing means of the switching means are in a circuit comprising in series primary windings of the first and second transformers and wherein said polarizing means are coupled to feedback coming from one of the secondary windings of the second transformer.

10. Dc/dc converter according to claim 9, wherein said feedback coming from one of the secondary windings of the second transformer is connected in parallel to diodes which are in a conductive state when the outputs of the protection circuit are in said second state.

11. Dc/dc converter according to claim 8, wherein the optimum drive circuit comprises a zener diode in series with a resistor.

12. Dc/dc converter according to claim 8, wherein said protection circuit is a bistable circuit.

13. Dc/dc converter according to claim 10, wherein said diodes are also connected to the outputs of said protection circuit.

14. Dc/dc converter according to claim 8, wherein said switching means are transistors.

* * * * *